United States Patent [19]

Knott

[11] 4,443,017
[45] Apr. 17, 1984

[54] ANNULAR SEAL

[75] Inventor: Henry J. Knott, Detroit, Mich.

[73] Assignee: Federal-Mogul Corporation, Southfield, Mich.

[21] Appl. No.: 426,394

[22] Filed: Sep. 29, 1982

[51] Int. Cl.³ .............................................. F16J 15/32
[52] U.S. Cl. ..................................... 277/152; 277/153; 277/179
[58] Field of Search ................. 277/179, 153, 152, 58; 308/187.1, 187.2

[56] References Cited

U.S. PATENT DOCUMENTS

| | | | |
|---|---|---|---|
| 2,768,849 | 10/1956 | Riesing | 277/153 |
| 2,797,944 | 7/1957 | Riesing | 277/153 |
| 2,873,153 | 2/1959 | Haynie | 308/187.2 |
| 3,346,265 | 10/1967 | Rhoades et al. | 277/152 |
| 3,848,881 | 11/1974 | Ginn | 277/181 |

Primary Examiner—Robert I. Smith
Attorney, Agent, or Firm—R. F. Hess

[57] ABSTRACT

An annular seal for providing a seal between a piston member and a cylinder. The seal comprises a resiliently deformable annular member made of elastomeric material having a sealing lip and an axially extending mounting face. The seal includes an annular retaining ring comprising more than one loop of wire which is disposed within and bonded together by the elastomeric material. The piston member includes a mounting surface having an L-shaped cross section which is adapted to receive the sealing member thereon. The retaining ring is designed to resiliently deform the elastomeric material of the sealing member which is located between the retaining ring and the axially directed portion of the mounting surface to provide the sole means for retaining the seal on the piston member.

5 Claims, 4 Drawing Figures

ANNULAR SEAL

BACKGROUND OF THE INVENTION

(1) Field of the Invention

The instant invention relates to a seal of the lip-seal variety for providing a seal between a piston member and piston cylinder of the type generally used in fluid-actuated transmissions.

(2) Description of the Prior Art

Fluid-actuated transmissions generally include one or more fluid-actuated pistons, each disposed within a corresponding cylinder. In order to properly function, a seal is required to maintain pressure within the piston chamber. Elastomeric ring seals have been used for perfecting the seal between the piston and the cylinder. Generally, these seals include a lip extending outwardly therefrom for perfecting the seal.

The design of these prior art seals require an additional means for maintaining the seal in place. This construction requires either additional structural features to be cast as part of the piston for retaining the seal thereon, such as a groove, or other additional fastening members, such as a separate retaining ring for securing the ring in place.

Means for maintaining a seal in place comprising an annular steel ring molded within the seal are well known in the art of making rotating seals. U.S. Pat. No. 2,797,944 to Riesing discloses one example of a seal reinforced by an annular metal ring. The Riesing seal discloses the use of a ring fabricated from metal strip which features serations on one edge to facilitate elastomer flow therearound. Since the ring is formed from steel strip it is prone to handling damage, especially prior to being molded into the seal. If the ring is mishandled, it may be dented or deformed, causing it to be unsuitable for use in a seal. Another example of such a seal is disclosed in U.S. Pat. No. 3,346,265 to Rhoads which discloses the use of a laminated metal reinforcing member made from a plurality of metal strips. The strips are knurled on one side to facilitate elastomer flow between the strips. The laminated construction is durable, but is too expensive for most seal applications.

The instant invention solves the above problems by providing a seal which includes integral means for maintaining the seal on a mounting surface that is inexpensive, simple to manufacture and resistant to handling damage.

SUMMARY OF THE INVENTION

The invention is to provide an annular seal comprising an annular sealing member of resiliently deformable elastomeric material defining a sealing lip and a mounting face. The seal is characterized by an annular retaining ring consisting of more than one loop of spring wire which is spaced radially from the mounting face. The retaining ring deforms the elastomeric material between the mounting face and the annular ring when the sealing member is mounted on a support member with the mounting face thereof engaging a mounting face of the support member. Thus, the retaining ring provides the sole means for retaining the sealing member on the support member.

The use of springwire as the retaining ring provides several advantages. Springwire is inexpensive and simple to shape into the desired circular configuration. The springwire is highly elastic and resists damage if mishandled either prior to or after being molded into the seal. If additional hoop strength or durability is required, the number of wire loops may be increased, or specifications of the steel wire may be changed without requiring expensive tooling changes. The elastomer flows into the spaces formed between adjacent loops of wire to hold the wires in place in the seal.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

With some minor exceptions, there are three basic types of annular lip seals used in the prior art for providing a seal between a piston and cylinder housing of standard fluid-actuated transmission assemblies.

Figure 3:
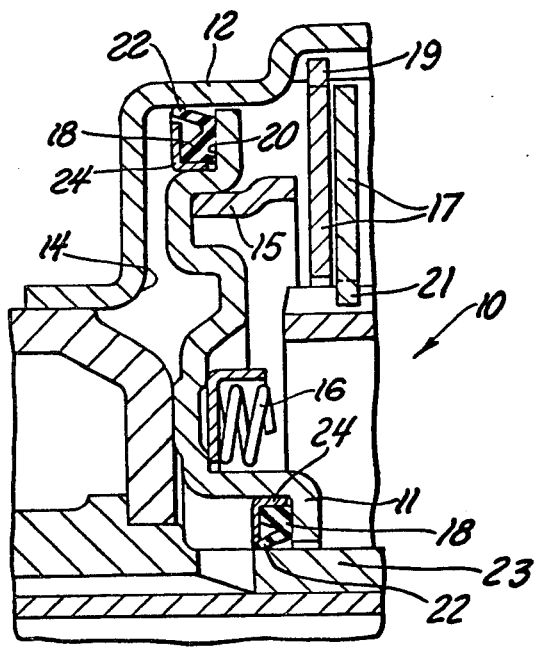
FIG. 3 is a cross-sectional, fragmentary view of a stamped piston assembly including a prior art seal.

As generally shown at 10 in FIG. 3, one type of assembly includes a stamped servo piston 11 disposed within a housing 12. FIG. 3 shows a typical assembly in which clutch rings 17 are keyed at 19 and 21 to two normally relatively rotatable parts. When the clutch applying ring 15 is actuated, the clutch rings 17 are shifted into frictional engagement and the two parts are forced to rotate together. The ring is carried by a piston-like member 11 which moves the ring 15 to the engaged position by hydraulic pressure. When the pressure is released, the piston 11 is returned by the force of return springs 16, thereby allowing the parts to rotate independently.

Figure 4:
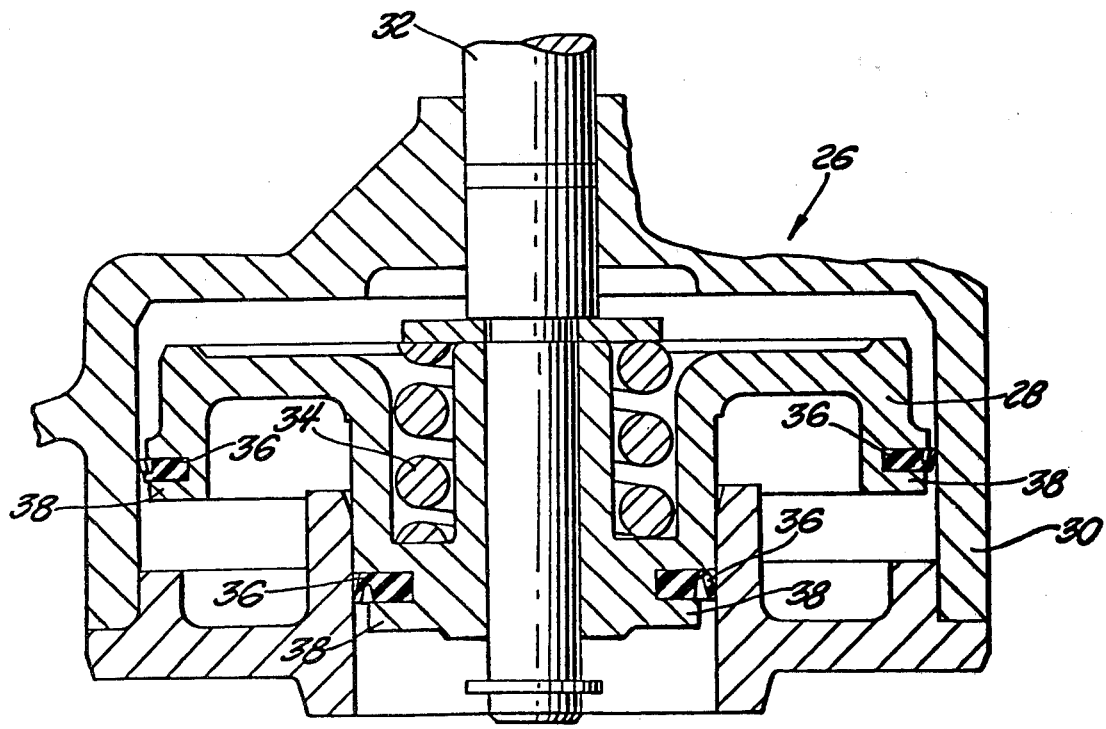
FIG. 4 is a cross-sectional view of a cast piston assembly including a prior art seal.

In order to seal the piston 11, annular sealing members 18 are disposed on shoulders 20 of the piston 11 which are formed in the stamped piston 11. Each of the sealing members 18 includes a lip 22 extending outwardly therefrom and away from the fluid-exposed surface (left hand side as viewed in FIG. 3) of the piston head 11. The sealing members 18 are secured in position by L-shaped annular retaining members 24. During assembly the retaining members 24 are press-fit onto the piston to form a three-sided groove which retains the sealing members 18 in place. Fluid pressure supplied by an appropriate inlet valve into the cavity 14 forces the lips 22 against the inner wall of the cylinder housing 12 and tubular member 23 during actuation of the clutch ring 17 sealing the piston 11 and the cylinder walls 12 and 23. A second construction commonly used in the prior art is generally shown at 26 in FIG. 4. This servo piston assembly includes a cast, rather than stamped, piston 28 slidably disposed within a cylinder housing 30. In this construction the piston 28 is guided by a piston rod 32 to which it is secured. The piston 28 is operated by a combination of forces provided by fluid pressure and a spring 34.

Disposed between the piston 28 and cylinder housing 30 are appropriate lip-type seals 36 oriented so as to form a seal during movement of the piston 28. The seals 36 are located in grooves which are cast or machined into the piston 28. In other words, the seals 36 are held in place on the piston by flange portion 38. Since the seals are entirely made of rubber they are simply stretched over the flange portions 38 during assembly.

A third lip seal construction (not shown) has been used wherein the seal includes an inwardly facing annular groove for receiving a radially extending flange portion located on the piston head. During assembly the seal is stretched over the annular flange or the seal is molded onto the flange.

Figure 1:
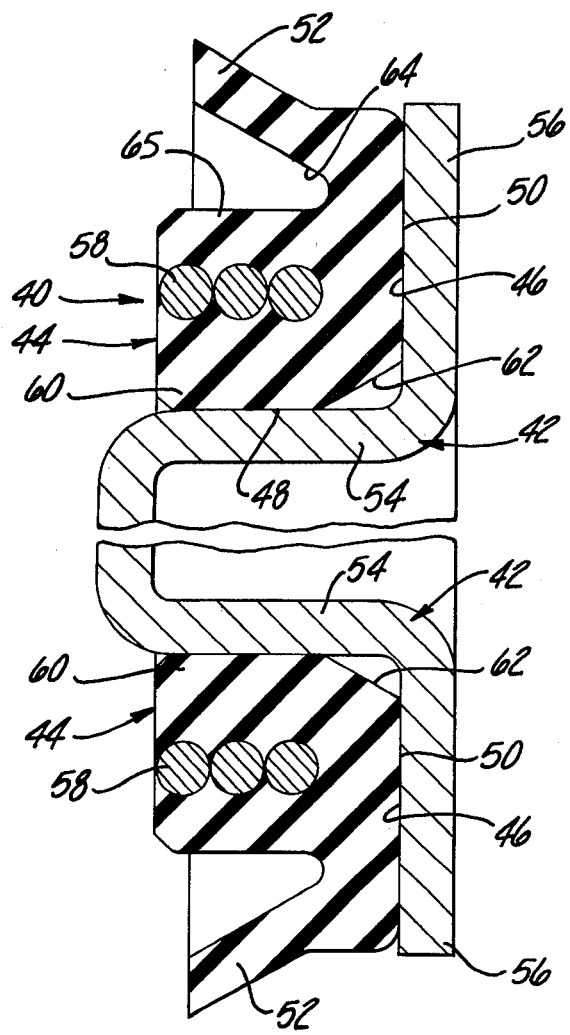
FIG. 1 is a cross-sectional elevational view of the subject seal mounted on a support member.
Figure 2:
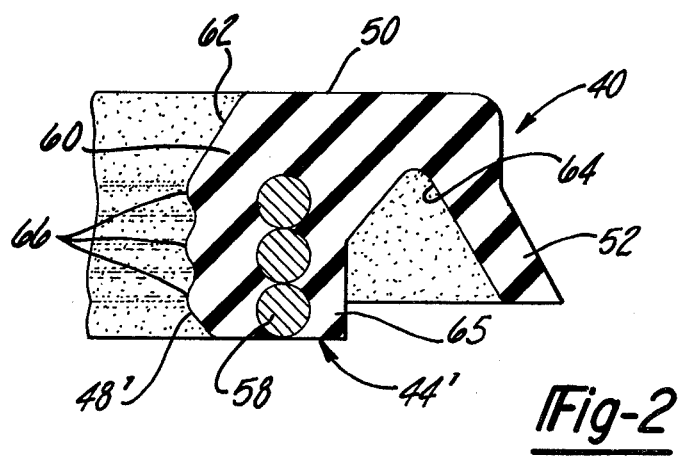
FIG. 2 is a cross-sectional view of an alternative embodiment of the instant invention.

The instant invention, generally shown at 40 in FIGS. 1 and 2, provides a lip seal that maintains its shape during processing, assembly and application, but is less costly because it eliminates the need for a machined or cast groove or additional metal part for retaining the seal on the piston. While this cost savings is relatively small on a per piece basis, it is significant due to the large volume of such servo piston assemblies.

With reference to FIG. 1, an assembly constructed in accordance with the instant invention includes a piston 42 of the stamped rather than cast type. It will be recognized, however, that the invention is equally applicable to a cast piston. The piston 42 includes an annular mounting surface 46. The mounting surface 46 is L-shaped in cross section having an axial portion 54 and a radial portion 56. The axial and radial portions define an open shoulder. The open shoulder design is contrasted with prior art designs which include a three-sided groove. An annular sealing member 44 is made of resiliently deformable elastomeric material and includes a body portion 60 forming an face 50. As with prior art annular seals, the instant invention provides an annular lip 52 for forming a seal between the piston and inner wall of a cylinder housing. The lip 52 defines a cavity 64 between it and the remaining portion 65 of the elastomeric sealing member 44. The lip 52 extends upwardly from the radially extending face 50 and outwardly from the mounting face 48. Thusly, the lip 52 is a flexible extension of the elastomeric sealing ring and extends beyond radial portion 56 of the piston 42 and into engagement with the cylinder wall of a piston housing. As previously described, fluid pressure against the seal extends the lip 52 outwardly thereby perfecting the seal against the wall of the piston housing. The mounting face 48 engages the axial portion 54 of the mounting surface 46 and the radially extending face 50 engages the radial portion 56.

In order to insure adequate retention of the seal on the open shoulder of the piston, the seal includes an annular retaining member 58. The retaining member 58 is in the form of a spirally wound coil comprising more than one loop of springwire which is molded within the body portion 60. The retaining member 58 deforms the elastomeric material of the seal against the axial portion 54 so that mounting face 48 of the sealing member 44 grips the axial portion 54 of the support piston 42. Hence the retaining member 58 provides the sole means for retaining the sealing member 44 on the piston 42. In other words, unlike the prior art piston shown in FIG. 3 which requires an additional retaining member 24 to secure the seal 18 on the shoulder 20 of the piston and unlike the piston shown in FIG. 4 which required a machined or cast groove, the instant invention 40 includes only the annular retaining member 58 for retaining the seals 44 on the piston 42. Thus, with the instant invention it is possible to eliminate one part of the prior art assemblies or to eliminate a machining operation or complicated casting.

Upon assembling the instant invention, the sealing member 44 is press-fit onto the mounting surface 46 of the piston 42 so that the material of the body 60 is compressed to tightly engage the axial portion 54 of the mounting surface 46 while the outer lip 52 remains undistorted. In contrast, the prior art seals which must be stretched during assembly are severely distorted and subject to damage. Thus, the instant invention provides a seal which is not exposed to unnecessary stresses during assembly. Additionally, the coil of springwire which forms the retaining member 58 has a high degree of resiliency which resists handling damage in comparison with prior art annular reinforcing rings made of steel strips.

Since a press-fit relationship is established with the piston, the annular sealing member 44 includes a chamfered portion 62 tapering outwardly from the mounting face 48 to the radial face 50. The chamfered portion 62 facilitates placement of the seal member 44 on the piston by providing an enlarged entrance for the open shoulder.

The retaining member 58 is preferably a coil of steel springwire; however, it can be made of non-ferrous material. The retention force which the sealing member 44 exerts upon the piston can easily be altered by changing the size of the wire, wire composition, or number of loops. This flexibility greatly facilitates tailoring the sealing member 44 to specific applications. It is anticipated, however, that for most seals the diameter of the wire will range from 0.04 to 0.1 inches and the number of wire loops will exceed one and one-half.

The loops of the retaining member 58 are held in position by the elastomer. The elastomer is molded about the retaining member 58 so that adjacent loops are mechanically bonded together. The mechanical bond results from the elastomer being bonded to the surface of each loop so that two adjacent loops are held together by the elastomer located between the loops. As shown in FIG. 1, the elastomer adheres to the entire periphery of wire, unless the adjacent loops are in contact at one point. To facilitate adhesion of the elastomer to the wire the wire should be prepared by cleaning, dipping in a phosphorous coating and then coating with an adhesive composition. There is no need to form passageways to facilitate elastomer flow about the retaining member 58, as was required with prior art laminated reinforcing elements, because the elastomer fills the interstitial spaces between adjacent loops. Radial forces exerted on the retaining member are resisted by the elastomer which bonds adjacent loops together. To expand the diameter of the retaining member either the wire must be severed or the bond of the elastomer between adjacent loops must be broken to allow the loops to slide relative to one another. In either case a relatively large radial force would be required to cause the retaining member 58 to yield. Any number of loops can be secured together in this way to obtain the desired retention force.

An alternative embodiment of the instant invention is shown in FIG. 2. The mounting face 48' of the sealing member 44' includes a number of ribs 66. The retaining member 58 compresses the ribs 66 against the mounting surface 46 of the support member 42 to retain the seal 44 thereon. The ribs 66 facilitate sealing by providing a plurality of static sealing bands against the axial portion 54. The ribs 66 also permit greater variation in the mounting face dimensions which, in turn, facilitates installation.

As shown in FIGS. 1 and 2, the sealing member 44 is disposed annularly about an L-shaped mounting surface, that is, it is an outer diameter seal with respect to the piston. Alternatively, the instant invention can be constructed so as to be disposed annularly within an L-shaped mounting surface so that it functions as an inner diameter seal. In accordance with this construction, the mounting face 48 would be disposed about the outer surface of the sealing member and the lip portion would extend inwardly. The elastomeric material outside the annular retaining ring would be compressed against the mounting surface thereby securing the seal on the piston. As with the previously described embodiment, the retaining member provides the sole means for retaining the sealing member on the piston.

It should be understood that the concept of using a spirally wound reinforcing coil could also be applied advantageously to rotating seals. The above description is directed to a reciprocating sealing member for illustrative purposes only.

The instant invention has been described in an illustrative manner and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

I claim:

1. An annular seal for a piston comprising an annular elastomeric seal body and a sealing lip extending radially from said body, said seal body including an axially extending mounting surface which is adapted to engage a support surface on said piston in interfering relationship and characterized by an annular retaining member located within said seal body and completely radially enclosed therewithin comprising a continuous, spirally wound, elastic, steel spring wire including multiple adjacent loops wherein said loops are generally aligned with said mounting surface and spaced apart therefrom to force said mounting surface against said support surface, said springwire being round in cross-section and said coil being normally closed whereby adjacent loops of said coil are in substantially point to point contact, said wire loops being mechanically bonded together by said elastomeric material being molded substantially entirely about said wire loops and into spaces formed between adjacent wire loops.

2. An annular seal as set forth in claim 1 wherein said seal springwire has a diameter ranging from about 0.04 inches to about 0.10 inches.

3. An annular seal as set forth in claim 2 wherein said mounting surface includes integral ribs extending outwardly therefrom, said annular retaining member deforming said ribs against said mounting surface.

4. A sealing assembly comprising: a support member presenting an annular mounting surface; said mounting surface being L-shaped in cross section having an axial leg and a radial leg defining an open shoulder at the axial extremity opposite said radial leg; an annular sealing member of resiliently deformable elastomeric material defining an axially extending mounting face, a radially extending radial face and a sealing lip spaced radially from said mounting face; said mounting face engaging said axial leg of said mounting surface and said radial face engaging the radial leg of said mounting surface, an annular retaining member located radially completely within said elastomeric material and spaced radially from said mounting face for deforming said elastomeric material between said annular retaining member and said mounting surface to press-fit said mounting face against said mounting surface thereby providing the sole means for retaining said sealing member on said support member, said annular retaining member comprising a continuous, spirally wound, elastic, steel springwire including multiple adjacent loops wherein said loops are generally aligned with said mounting face and spaced apart therefrom to force said mounting face against said mounting surface, said spring wire being round in cross-sections and said coil being normally closed whereby adjacent loops of said coil are in substantially point to point contact, said wire loops being mechanically bonded together by said elastomeric material being molded substantially entirely about said wire loops and into spaces formed between adjacent wire loops.

5. A seal assembly as set forth in claim 4 wherein said steel springwire has a diameter ranging from about 0.04 inches to about 0.10 inches.

* * * * *

UNITED STATES PATENT AND TRADEMARK OFFICE
CERTIFICATE OF CORRECTION

PATENT NO. : 4,443,017
DATED : April 17, 1984
INVENTOR(S) : Henry J. Knott

It is certified that error appears in the above-identified patent and that said Letters Patent is hereby corrected as shown below:

Col. 6, line 5 (Claim 2) "seal" should be --steel--

Signed and Sealed this

Twenty-sixth Day of March 1985

[SEAL]

Attest:

DONALD J. QUIGG

Attesting Officer

Acting Commissioner of Patents and Trademarks